US011893971B2

(12) United States Patent
Park et al.

(10) Patent No.: US 11,893,971 B2
(45) Date of Patent: Feb. 6, 2024

(54) SOUND INSULATION PLATE AND SOUND INSULATION STRUCTURE USING THE SAME

(71) Applicants: CENTER FOR ADVANCED META-MATERIALS, Daejeon (KR); JJNS CO., LTD., Daejeon (KR)

(72) Inventors: Jong Jin Park, Sejong-si (KR); Jun Hyuk Kwak, Sejong-si (KR); Hak Joo Lee, Daejeon (KR)

(73) Assignees: CENTER FOR ADVANCED META-MATERIALS, Daejeon (KR); JJNS CO., LTD., Daejeon (KR)

( * ) Notice: Subject to any disclaimer, the term of this patent is extended or adjusted under 35 U.S.C. 154(b) by 358 days.

(21) Appl. No.: 17/601,955

(22) PCT Filed: Mar. 16, 2021

(86) PCT No.: PCT/KR2021/003220
§ 371 (c)(1),
(2) Date: Oct. 7, 2021

(87) PCT Pub. No.: WO2022/158638
PCT Pub. Date: Jul. 28, 2022

(65) Prior Publication Data

US 2023/0124844 A1 Apr. 20, 2023

(30) Foreign Application Priority Data

Jan. 20, 2021 (KR) ........................ 10-2021-0007947

(51) Int. Cl.
*G10K 11/172* (2006.01)
*E04B 1/86* (2006.01)
*E04B 1/84* (2006.01)

(52) U.S. Cl.
CPC .............. *G10K 11/172* (2013.01); *E04B 1/86* (2013.01); *E04B 2001/8414* (2013.01); *E04B 2001/8452* (2013.01)

(58) Field of Classification Search
CPC . G10K 11/172; E04B 1/86; E04B 2001/8414; E04B 2001/8452
See application file for complete search history.

(56) References Cited

U.S. PATENT DOCUMENTS 10,704,255 B2 * 7/2020 Hakuta ................. E04B 1/8409
2013/0087407 A1 * 4/2013 McKnight ............ G10K 11/172
181/287

(Continued)

FOREIGN PATENT DOCUMENTS

JP 11-352973 A 12/1999
JP 2006-290156 A 10/2006

(Continued)

OTHER PUBLICATIONS

International Search Report for PCT/KR2021/003220 dated Oct. 5, 2021 from Korean Intellectual Property Office.

*Primary Examiner* — Jeremy A Luks
(74) *Attorney, Agent, or Firm* — Revolution IP, PLLC

(57) ABSTRACT

A sound insulation plate includes a patterned frame and an elastic membrane, wherein the patterned frame includes a central pattern region and multiple peripheral pattern regions arranged around the central pattern region, the multiple peripheral pattern regions being separated from the central pattern region by a separation bar, and wherein the elastic membrane is mounted on the patterned frame to block passage of air and converts airborne sound waves into elastic waves.

10 Claims, 9 Drawing Sheets

(56) References Cited

U.S. PATENT DOCUMENTS

| | | | | |
|---|---|---|---|---|
| 2019/0295522 | A1* | 9/2019 | Hakuta | G10K 11/16 |
| 2020/0223375 | A1* | 7/2020 | Hakuta | B60R 13/0884 |

FOREIGN PATENT DOCUMENTS

| | | | |
|---|---|---|---|
| KR | 10-2009-0097628 | A | 9/2009 |
| KR | 10-1163351 | B1 | 7/2012 |
| KR | 10-1356556 | B1 | 2/2014 |

* cited by examiner

【FIG. 1】
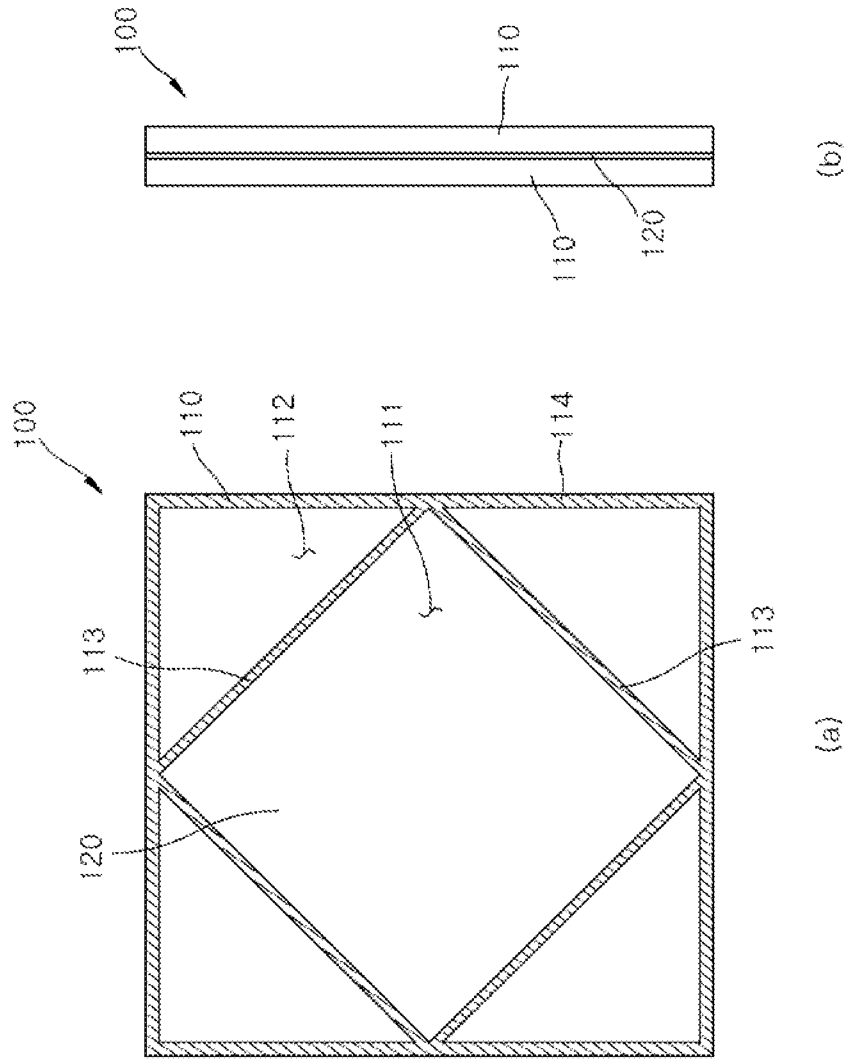

【FIG. 2】
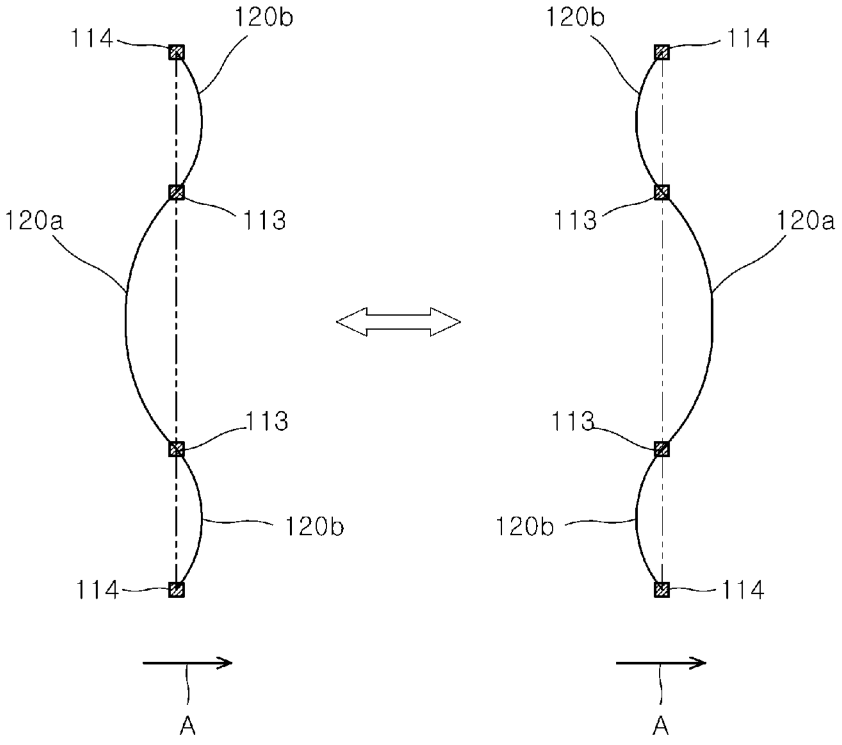

【FIG. 3】
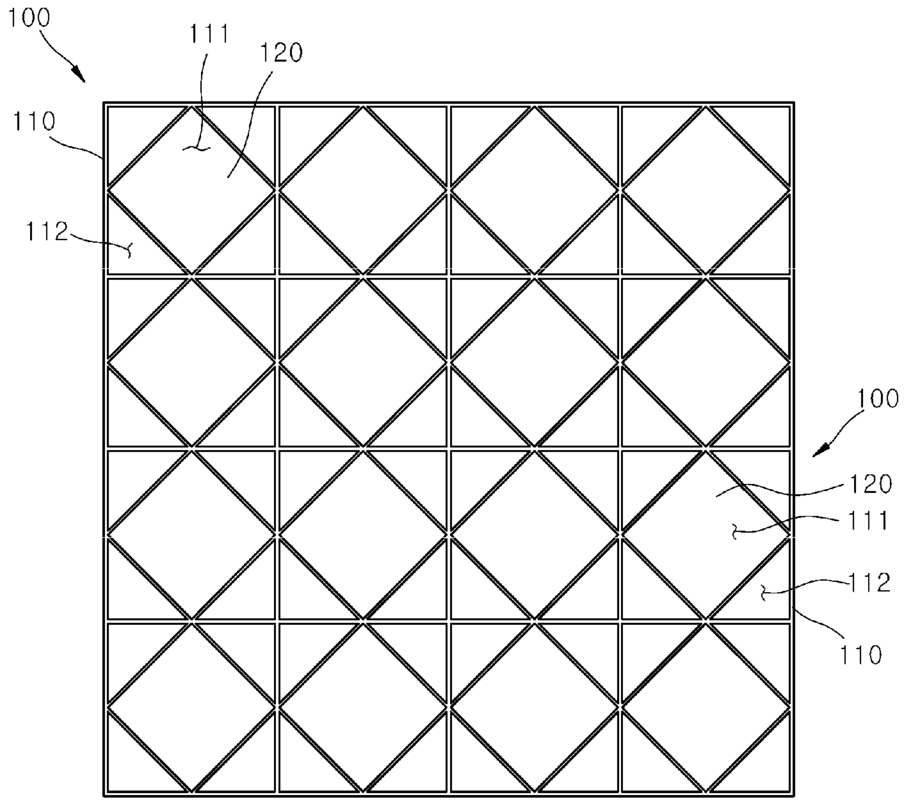

【FIG. 4】
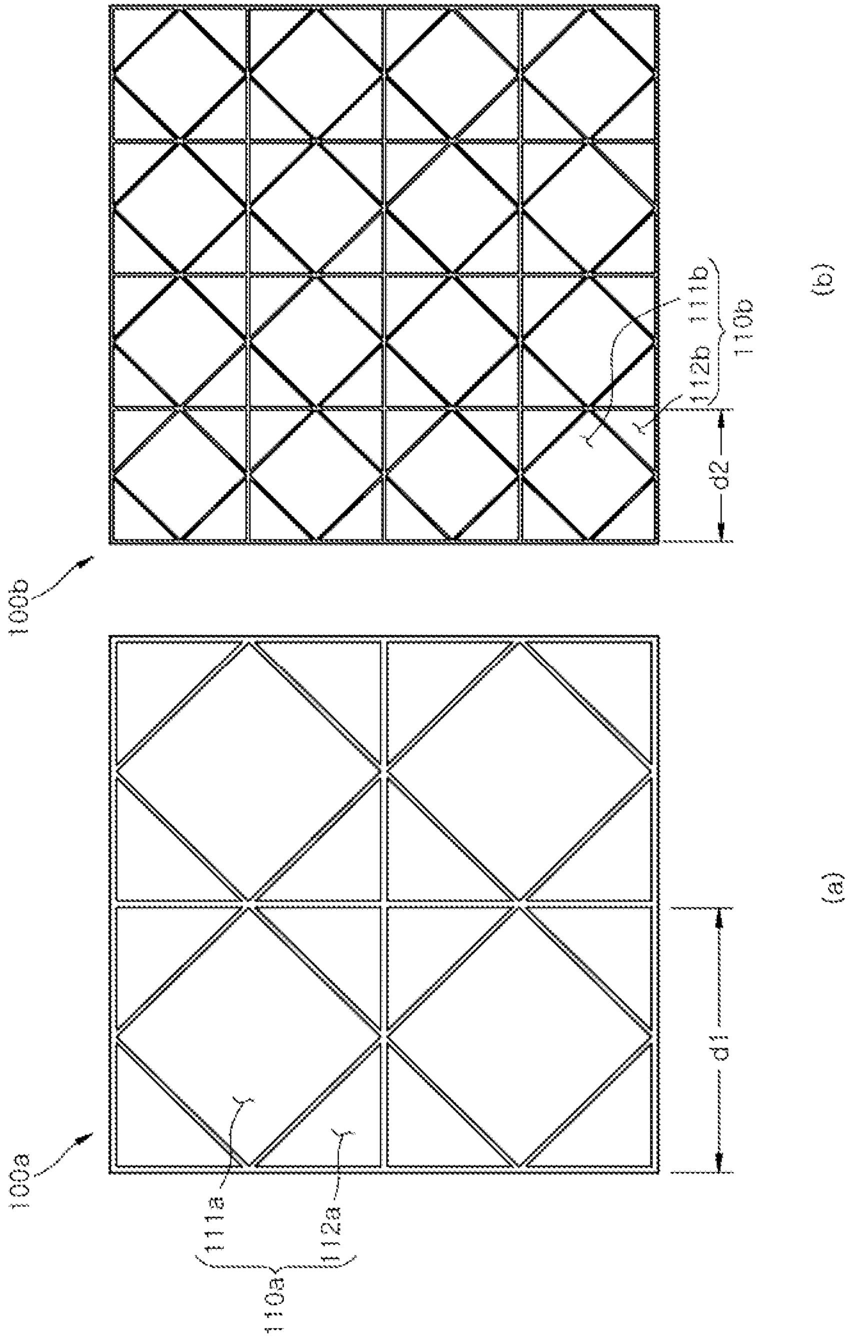

【FIG. 5】
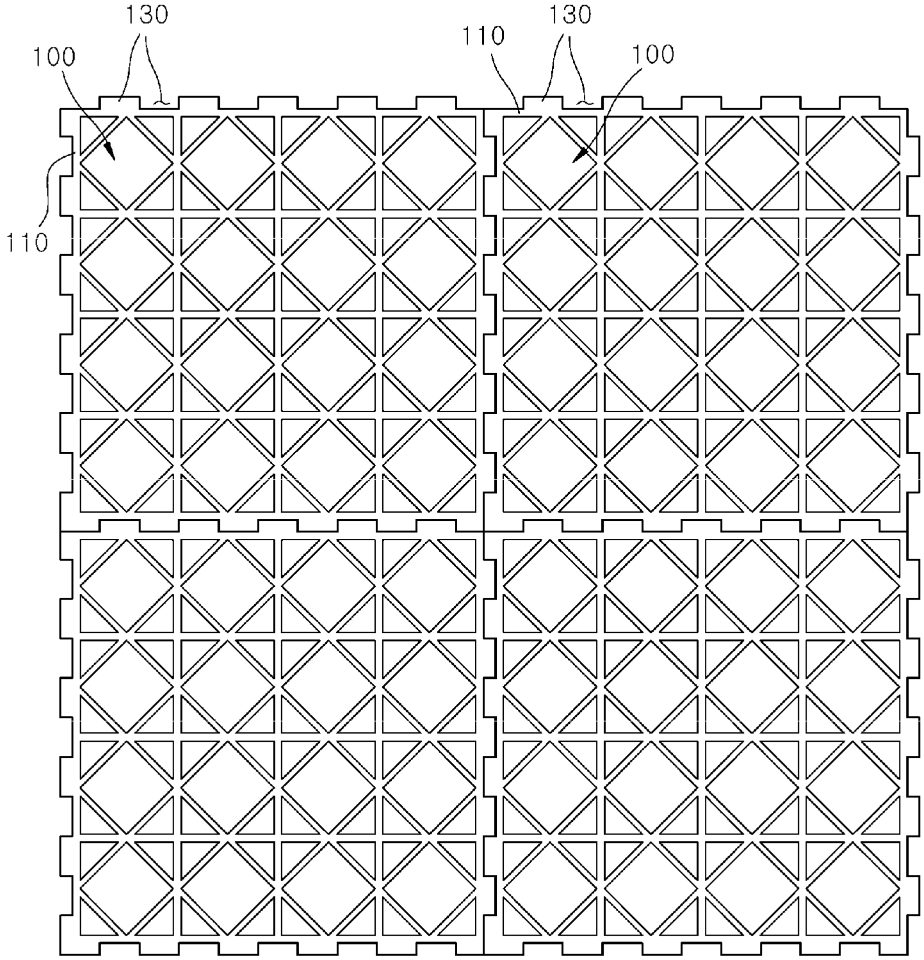

【FIG. 6】
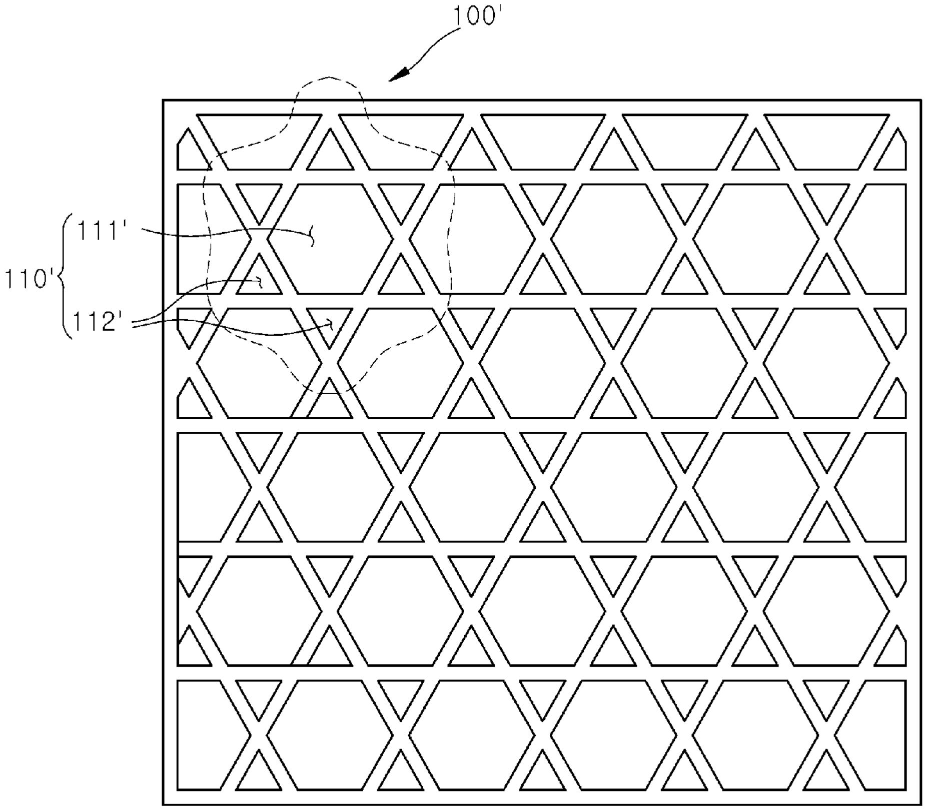

【FIG. 7】
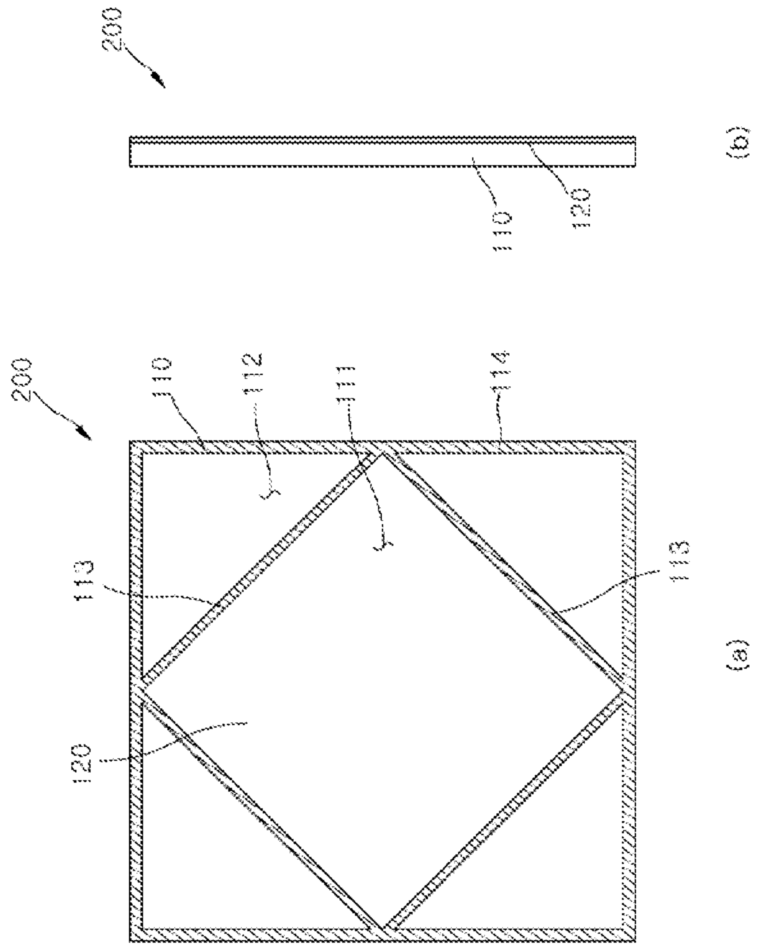

【FIG. 8】
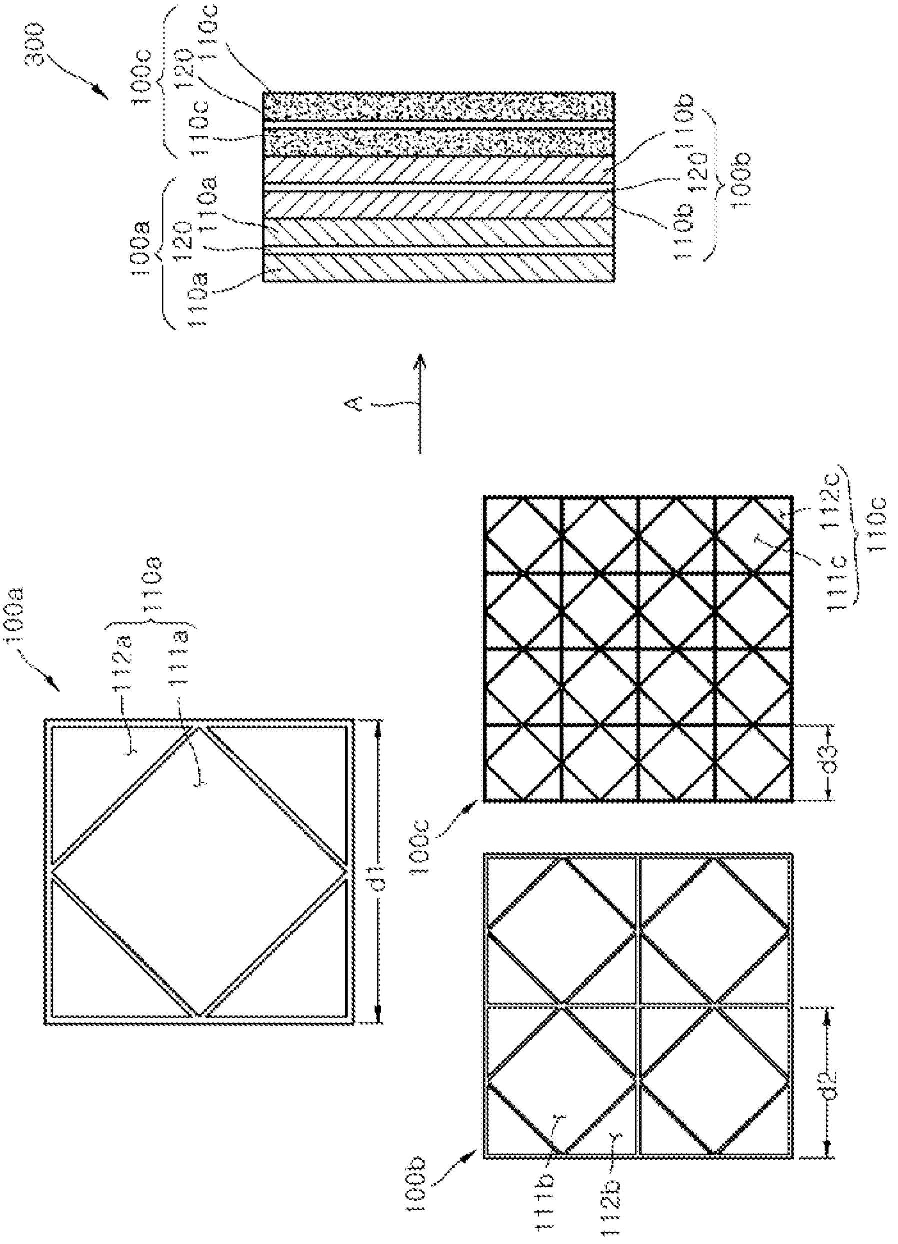

【FIG. 9】
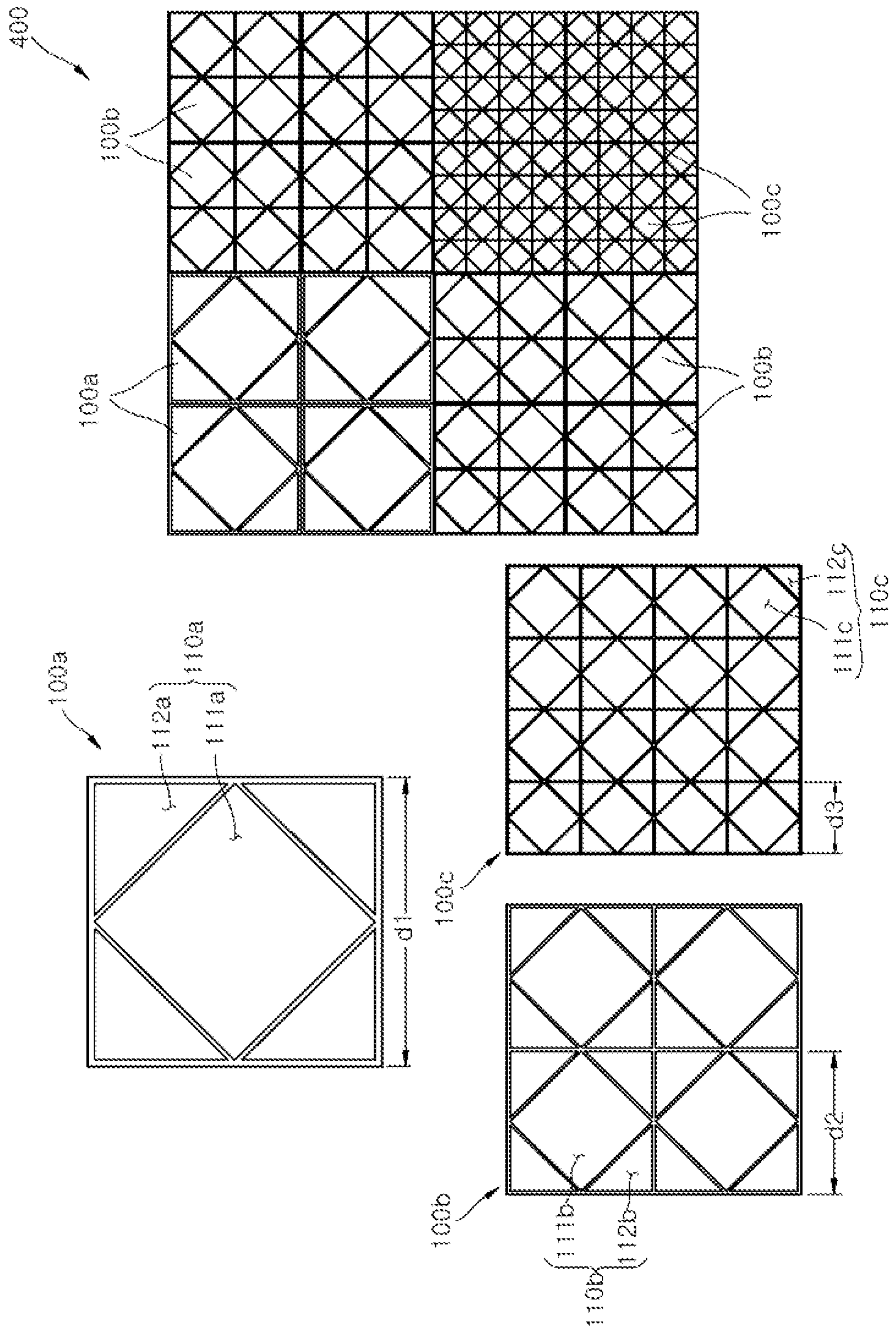

SOUND INSULATION PLATE AND SOUND INSULATION STRUCTURE USING THE SAME

CROSS REFERENCE TO PRIOR APPLICATIONS

This application is a National Stage Application of PCT International Patent Application No. PCT/KR2021/003220 filed on Mar. 16, 2021, under 35 U.S.C. § 371, which claims priority to Korean Patent Application No. 10-2021-0007947 filed on Jan. 20, 2021, respectively, which are all hereby incorporated by reference in their entirety.

TECHNICAL FIELD

The present invention relates to a sound insulation plate and a sound insulation structure using the same, and more particularly to a lightweight sound insulation plate which can block low frequency noise, and a sound insulation structure using the same.

BACKGROUND ART

Sound insulators prevent transmission of sound waves by completely reflecting the energy of the sound waves and are thus used in fields that require soundproofing.

In general, plate-like materials having good noise blocking properties, such as sheet steel, plastic plywood, drywall, and synthetic rubber, are attached to a structure to control transmission of sound waves through the structure while reducing noise carried through the structure.

Such sound insulators are used for soundproofing between floors or rooms or soundproofing for machine rooms or air-conditioning rooms, as well as used as a material for noise barrier walls. In addition, the sound insulators are used in special purpose rooms requiring 100% blocking of outside noise, such as broadcasting studios, recording rooms, and instrument practice rooms, in order to block noise at various frequencies.

However, sound insulators obey the acoustic mass law, which is a law of physics that says a transmission loss of sound through a barrier (sound insulator) depends on the product of the areal density of the barrier and the frequency of sound. According to this law, sound insulation increases with increasing weight (density) of the barrier or with increasing frequency of sound.

Typical sound insulators, such as sheet steel, synthetic rubber, and drywall, have the drawback of heavy weight due to high density of raw materials thereof and are effective in blocking high frequency noise, but not in blocking low frequency noise. This is because, in view of the fact that there is a correlation between the thickness of a sound insulator and the frequency of noise to be blocked, the sound insulator needs to be increased in thickness to block low frequency noise, which leads to increase in weight of the sound insulator and thus difficulty in providing weight reduction.

DISCLOSURE

Technical Problem

Embodiments of the present invention are conceived to solve such a problem in the art and provide a sound insulation plate which can effectively block low frequency noise through a simple structure in which an elastic membrane converting airborne sound waves into elastic waves is mounted on a patterned frame including a central pattern region and multiple peripheral pattern regions, and a sound insulation structure using the same.

Technical Solution

In accordance with one aspect of the present invention, a sound insulation plate includes: a patterned frame including a central pattern region and multiple peripheral pattern regions arranged around the central pattern region, the multiple peripheral pattern regions being separated from the central pattern region by a separation bar; and an elastic membrane mounted on the patterned frame and blocking passage of air while converting airborne sound waves into elastic waves, wherein, at a resonant frequency of the sound insulation plate, a direction of displacement of a portion of the elastic membrane within the central pattern region is opposite to a direction of displacement of a portion of the elastic membrane within the peripheral pattern regions.

In the sound insulation plate according to the present invention, an area of the central pattern region may be the same as the sum of areas of the multiple peripheral pattern regions.

In the sound insulation plate according to the present invention, the central pattern region may have a polygonal shape and the multiple peripheral pattern regions may adjoin sides of the central pattern region, respectively.

In the sound insulation plate according to the present invention, the multiple peripheral pattern regions may have a triangular shape and may adjoin the sides of the central pattern region, respectively.

In the sound insulation plate according to the present invention, when a target frequency of noise to be blocked is relatively low, the patterned frame may have a relatively large size and, when the target frequency of noise to be blocked is relatively high, the patterned frame may have a relatively small size.

In the sound insulation plate according to the present invention, the patterned frame may include a plurality of patterned frames, wherein the plurality of patterned frames may be mounted on opposite surfaces of the elastic membrane, respectively.

In the sound insulation plate according to the present invention, the patterned frame may be mounted on one surface of the elastic membrane.

In the sound insulation plate according to the present invention, the patterned frame may further include a plurality of raised and recessed portions along a periphery thereof and neighboring patterned frames are coupled to one another via the raised and recessed portions.

In accordance with another aspect of the present invention, a sound insulation structure includes the sound insulation plate according to the present invention, wherein the sound insulation plate includes multiple sound insulation plates, each of respective patterned frames of the multiple sound insulation plates has a different size, the multiple sound insulation plates are arranged in an air flow direction, and each of the multiple sound insulation plates has a different resonant frequency to block noise having a different frequency.

In accordance with a further aspect of the present invention, a sound insulation structure includes the sound insulation plate according to the present invention, wherein the sound insulation plate includes multiple sound insulation plates, each of respective patterned frames of the multiple sound insulation plates has a different size, the multiple sound insulation plates are arranged in a direction crossing an air flow direction, and each of the multiple sound insulation plates has a different resonant frequency to block noise having a different frequency.

Advantageous Effects

The sound insulation plate according to the present invention and the sound insulation structure using the same can effectively block low frequency noise through a simple structure.

In addition, the sound insulation plate according to the present invention and the sound insulation structure using the same can provide reduction in system weight and volume.

Further, the sound insulation plate according to the present invention and the sound insulation structure using the same can block noise in various frequency ranges by broadening the target frequency range of noise to be blocked.

DESCRIPTION OF DRAWINGS

FIG. 1 is a view of a sound insulation plate according to one embodiment of the present invention.

FIG. 2 is a view illustrating the principle of the sound insulation plate of FIG. 1.

FIG. 3 is a view of multiple sound insulation plates as shown in FIG. 1, wherein the multiple sound insulation plates are arranged in a matrix.

FIG. 4 is a view illustrating different sizes of central pattern regions and peripheral pattern regions of the sound insulation plate of FIG. 1.

FIG. 5 is a view illustrating the sound insulation plate of FIG. 1, along with raised and recessed portions formed on the sound insulation plate.

FIG. 6 is a view illustrating an exemplary modification of the sound insulation plate of FIG. 1.

FIG. 7 is a view of a sound insulation plate according to another embodiment of the present invention.

FIG. 8 is a view of a sound insulation structure according to one embodiment of the present invention.

FIG. 9 is a view of a sound insulation structure according to another embodiment of the present invention.

BEST MODE

Hereinafter, embodiments of a sound insulation plate according to the present invention and a sound insulation structure using the same will be described with reference to the accompanying drawings.

FIG. 1 is a view of a sound insulation plate according to one embodiment of the present invention, FIG. 2 is a view illustrating the principle of the sound insulation plate of FIG. 1, FIG. 3 is a view of multiple sound insulation plates as shown in FIG. 1, wherein the multiple sound insulation plates are arranged in a matrix, FIG. 4 is a view illustrating different sizes of central pattern regions and peripheral pattern regions of the sound insulation plate of FIG. 1, and FIG. 5 is a view illustrating the sound insulation plate of FIG. 1, along with raised and recessed portions formed on the sound insulation plate.

Referring to FIG. 1 to FIG. 5, a sound insulation plate 100 according to this embodiment is a lightweight sound insulation plate adapted to block low frequency noise, and includes a patterned frame 110, an elastic membrane 120, and raised and recessed portions 130.

The patterned frame 110 includes a central pattern region 111 and multiple peripheral pattern regions 112.

The patterned frame 110 has an outer frame 114 and the central pattern region 111 and the multiple peripheral pattern regions 112 are formed inside the outer frame 114.

The central pattern region 111 is located at the center of the patterned frame 110. The central pattern region 111 is surrounded by a separation bar 113 and is open in an air flow direction.

The multiple peripheral pattern regions 112 are arranged around the central pattern region 111. Each of the multiple peripheral pattern regions 112 is separated from the central pattern region 111 by the separation bar 113 and is open in the air flow direction, like the central pattern region 111.

In this embodiment, the central pattern region 111 may have a rectangular shape among polygonal shapes, and the multiple peripheral pattern regions 112 may have a triangular shape and may adjoin sides of the central pattern region 111, respectively.

The patterned frame 110 may be formed of plastics, such as polypropylene (PP), polycarbonate (PC), acetal, acrylic, and acrylonitrile-butadiene-styrene (ABS). However, it will be understood that the present invention is not limited thereto and the patterned frame 110 may be formed of various other materials that can provide weight reduction.

The elastic membrane 120 is mounted on the patterned frame 110 to block the passage of air, and converts airborne sound waves into elastic waves.

The elastic membrane 120 may be formed of low-density polyethylene (LDPE), polyurethane (PU), polyethylene terephthalate (PET), polypropylene (PP), or latex. However, it will be understood that the present invention is not limited thereto and the elastic membrane 120 may be formed of various other materials that can provide weight reduction.

In the sound insulation plate 100 according to this embodiment, the patterned frame 100 may include a plurality of patterned frames, wherein the plurality of patterned frames 110 may be mounted on opposite surfaces of the elastic membrane 120, respectively.

Referring to FIG. 2, at a resonance frequency of the sound insulation plate 100, a direction of displacement of a portion 120*a* of the elastic membrane within the central pattern region is opposite to a direction of displacement of a portion 120*b* of the elastic membrane within the peripheral pattern regions. Here, the sound insulation plate 100 is designed to have a resonant frequency identical to a target frequency of noise to be blocked.

For example, at the resonant frequency of the sound insulation plate 100, in one moment, displacement of the portion 120*b* of the elastic membrane within the peripheral pattern regions occurs in an air flow direction A and displacement of the portion 120*a* of the elastic membrane 120*a* within the central pattern region occurs in an opposite direction with respect to the air flow direction A. In another moment, displacement of the portion 120*b* of the elastic membrane within the peripheral pattern regions occurs in the opposite direction with respect to the air flow direction A and displacement of the portion 120*a* of the elastic membrane within the central pattern region occurs in the air flow direction A.

As such, a resonance mode is repeated in which, when the portion 120*a* of the elastic membrane within the central pattern region has a positive displacement with respect to the air flow direction A, the portion 120*b* of the elastic membrane within the peripheral pattern regions has a negative displacement with respect to the air flow direction A and, when the portion 120*a* of the elastic membrane within the central pattern region has a negative displacement with respect to the air flow direction A, the portion 120*b* of the elastic membrane within the peripheral pattern regions has a positive displacement with respect to the air flow direction A.

As displacement of the portion 120*a* of the elastic membrane within the central pattern region and displacement of the portion 120*b* of the elastic membrane within the peripheral pattern regions occur in opposite directions, an effective displacement of the elastic membrane 120 approaches almost zero, wherein the effective displacement represents the average of local displacements of the elastic membrane 120.

When the effective displacement of the elastic membrane 120 has a value of zero, a phenomenon occurs in which almost no airborne sound energy is transmitted through the elastic membrane 120, whereby noise in a target frequency range can be blocked without being transmitted downstream of the elastic membrane 120.

The phenomenon that the effective displacement of the elastic membrane 120 approaches almost zero is expressed as an effective density of air being maximized. If the effective density of air is maximized, sound waves will react as if the sound insulation plate 100 is a very heavy wall and thus will be reflected upon arriving at the sound insulation plate 100, whereby transmission of the sound waves can be blocked.

Here, it is desirable that the area of the central pattern region 111 be substantially the same as the sum of the areas of the multiple peripheral pattern regions 112. That is because the area of the elastic membrane having a positive displacement needs to be the same as the area of the elastic membrane having a negative displacement in order for the effective displacement of the elastic membrane 120 to be zero.

The resonant frequency of the sound insulation plate 100 may be adjusted by changing the pattern of the patterned frame 110, the thickness of the elastic membrane 120, tension of the elastic membrane 120, and the like.

Although one sound insulation plate 100 is shown in FIG. 1 for convenience of description of the structure of the sound insulation plate 100 according to the present invention, it will be understood that the present invention is not limited thereto and multiple sound insulation plates 100 may be arranged in a matrix, as shown in FIG. 3. Arrangement of the multiple sound insulation plates as shown in FIG. 3 allows sound insulation to be achieved over a larger area.

In the present invention, the size of the patterned frame 110 may be adjusted based on a target frequency range of noise to be blocked.

Referring to FIG. 4(*a*), when a target frequency of noise to be blocked is relatively low, a patterned frame 110*a* having a relatively large size d1 may be used. Conversely, referring to FIG. 4(*b*), when the target frequency of noise to be blocked is relatively high, a patterned frame 110*a* having a relatively small size d2 may be used.

Here, it is desirable that the size of a central pattern region 111*a* or 111*b* and the size of a peripheral pattern region 112*a* or 112*b* be varied in proportion to the size of the patterned frame 110*a* or 110*b*.

The patterned frame 110 according to the present invention may further include a plurality of raised and recessed portions 130 formed along a periphery thereof.

Referring to FIG. 5, the sound insulation plate includes a plurality of raised and recessed portions 130 formed along the periphery of the patterned frame 110, such that neighboring patterned frames 110 may be coupled to one another via the raised and recessed portions 130. That is, the raised and recessed portions 130 facilitate assembly of many patterned frames 110, thereby allowing fabrication of a large area sound insulation plate.

FIG. 6 is a view of an exemplary modification of the sound insulation plate of FIG. 1.

Although the central pattern region 111 of the patterned frame 110 is shown as having a rectangular shape in the embodiment shown in FIG. 1, in the modified sound insulation plate 100' shown in FIG. 6, a central pattern region 111' of a patterned frame 110' may have a hexagonal shape. Peripheral pattern regions 112' of the modified sound insulation plate may adjoin sides of the central pattern region 111', respectively, as in the embodiment of FIG. 1.

The central pattern region 111 of the patterned frame 110 may have various polygonal shapes, such as a rectangular shape, a hexagonal shape, and an octagonal shape, and the peripheral pattern region 112 adjoining a corresponding side of the central pattern region 111 preferably has a triangular shape.

As shown in FIG. 1 and FIG. 6, the peripheral pattern region 112 needs to have a triangular shape in order to efficiently arrange many central pattern regions 111 and many peripheral pattern regions 112 without any empty space therebetween.

FIG. 7 is a view of a sound insulation plate according to another embodiment of the present invention.

Unlike in the embodiment shown in FIG. 1, in which the patterned frame 110 is mounted on both surfaces of the elastic membrane 120, in a sound insulation plate 200 according to the embodiment shown in FIG. 7, the patterned frame 110 may be mounted on only one surface of the elastic membrane 120.

Although the sound insulation plate 200 according to the embodiment shown in FIG. 7 also provides sound insulation, the sound insulation plate 200 may have a slightly different resonant frequency than the sound insulation plate 100 according to the embodiment of FIG. 1, which has the same size.

FIG. 8 is a view of a sound insulation structure according to one embodiment of the present invention and FIG. 9 is a view of a sound insulation structure according to another embodiment of the present invention.

Referring to FIG. 8, a sound insulation structure 300 according to this embodiment includes multiple sound insulation plates 100*a*, 100*b*, 100*c*, which may be arranged in an air flow direction A.

Here, each of the patterned frames 110*a*, 110*b*, 110*c* may have a different size d1, d2, d3. Accordingly, each of the patterned frames 110*a*, 110*b*, 110*c* has a different resonant frequency and thus can block noise having a different frequency.

Referring to FIG. 9, a sound insulation structure 300 according to this embodiment includes multiple sound insulation plates 100*a*, 100*b*, 100*c*, which may be arranged in a direction crossing the air flow direction A.

Here, each of the patterned frames 110*a*, 110*b*, 110*c* may have a different size d1, d2, d3. Accordingly, each of the patterned frames 110*a*, 110*b*, 110*c* has a different resonant frequency and thus can block noise having a different frequency.

In the embodiments of FIG. 8 and FIG. 9, by way of example, the first patterned frame 110*a* has the largest size d1, the second patterned frame 110*b* has an intermediate size d2, and the third patterned frame 110*c* has the smallest size d3.

Accordingly, a target frequency of noise blocked by the first sound insulation plate 100*a* is highest, a target frequency of noise blocked by the second sound insulation plate 100*b* is intermediate, and a target frequency of noise blocked by the third sound insulation plate 100*c* is lowest.

In the embodiments of FIG. 8 and FIG. 9, it is desirable that the size of central pattern regions 111*a*, 111*b*, 111*c* and the size of peripheral pattern regions 112*a*, 112*b*, 112*c* be varied in proportion to the size of the patterned frames 110*a*, 110*b*, 110*c*.

The sound insulation structures shown in FIG. 8 and FIG. 9 allow broadening of the target frequency range of noise to be blocked and thus can block noise in various frequency ranges.

The sound insulation plate according to the present invention and the sound insulation structure using the same can effectively block low frequency noise through a simple structure in which an elastic membrane converting airborne sound waves into elastic waves is mounted on a patterned frame including a central pattern region and multiple peripheral pattern regions.

In addition, the sound insulation plate according to the present invention and the sound insulation structure using the same can provide reduction in system weight and volume by employing a plastic patterned frame and a low-density elastic membrane.

Further, the sound insulation plate according to the present invention and the sound insulation structure using the same can block noise in various frequency ranges by broadening the target frequency range of noise to be blocked using multiple sound insulation plates having different resonant frequencies.

Although some embodiments and modifications thereof have been described herein, it should be understood that these embodiments are given by way of illustration only and the present invention is not limited thereto, and that these embodiments may be embodied in a variety of other forms. It will be appreciated by those skilled in the art that various changes and modifications may be made to the details of the above-described embodiments without departing from the spirit and scope of the present invention as set forth in the following claims.

INDUSTRIAL APPLICABILITY

The present invention is industrially applicable to the field of lightweight sound insulation plates adapted to block low frequency noise.

The invention claimed is:

1. A sound insulation plate comprising:

a patterned frame comprising a central pattern region and multiple peripheral pattern regions arranged around the central pattern region, the multiple peripheral pattern regions being separated from the central pattern region by a separation bar; and an elastic membrane mounted on the patterned frame and blocking passage of air while converting airborne sound waves into elastic waves, wherein, at a resonant frequency of the sound insulation plate, a direction of displacement of a portion of the elastic membrane within the central pattern region is opposite to a direction of displacement of a portion of the elastic membrane within the peripheral pattern regions.

2. The sound insulation plate according to claim 1, wherein an area of the central pattern region is the same as the sum of areas of the multiple peripheral pattern regions.

3. The sound insulation plate according to claim 1, wherein:

the central pattern region has a polygonal shape; and the multiple peripheral pattern regions adjoin sides of the central pattern region, respectively.

4. The sound insulation plate according to claim 3, wherein the multiple peripheral pattern regions have a triangular shape and adjoin the sides of the central pattern region, respectively.

5. The sound insulation plate according to claim 1, wherein, when a target frequency of noise to be blocked is relatively low, the patterned frame has a relatively large size and, when the target frequency of noise to be blocked is relatively high, the patterned frame has a relatively small size.

6. The sound insulation plate according to claim 1, wherein the patterned frame comprises a plurality of patterned frames, the plurality of patterned frames being mounted on opposite surfaces of the elastic membrane, respectively.

7. The sound insulation plate according to claim 1, wherein the patterned frame is mounted on one surface of the elastic membrane.

8. The sound insulation plate according to claim 1, wherein:

the patterned frame further comprises a plurality of raised and recessed portions along a periphery thereof; and neighboring patterned frames are coupled to one another via the raised and recessed portions.

9. A sound insulation structure comprising the sound insulation plate according to claim 1, wherein the sound insulation plate comprises multiple sound insulation plates;

each of respective patterned frames of the multiple sound insulation plates has a different size;

the multiple sound insulation plates are arranged in an air flow direction; and each of the multiple sound insulation plates has a different resonant frequency to block noise having a different frequency.

10. A sound insulation structure comprising the sound insulation plate according to claim 1, wherein the sound insulation plate comprises multiple sound insulation plates;

each of respective patterned frames of the multiple sound insulation plates has a different size;

the multiple sound insulation plates are arranged in a direction crossing an air flow direction; and each of the multiple sound insulation plates has a different resonant frequency to block noise having a different frequency.

* * * * *